United States Patent
Farris et al.

(10) Patent No.: US 9,310,813 B2
(45) Date of Patent: Apr. 12, 2016

(54) WATER HEATER APPLIANCE AND A METHOD FOR OPERATING THE SAME

(71) Applicant: General Electric Company, Schenectady, NY (US)

(72) Inventors: Brett Alan Farris, Louisville, KY (US); Craig Iung-Pei Tsai, Louisville, KY (US); Eric Jeffrey Klingeman, Louisville, KY (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 13/938,325

(22) Filed: Jul. 10, 2013

(65) Prior Publication Data

US 2015/0013622 A1    Jan. 15, 2015

(51) Int. Cl.
| | |
|---|---|
| *F24H 1/48* | (2006.01) |
| *G05D 23/13* | (2006.01) |
| *F24H 1/20* | (2006.01) |
| *F24H 9/12* | (2006.01) |
| *F24H 9/20* | (2006.01) |

(52) U.S. Cl.
CPC ............ *G05D 23/1366* (2013.01); *F24H 1/202* (2013.01); *F24H 9/124* (2013.01); *F24H 9/2021* (2013.01); *Y10T 137/6416* (2015.04)

(58) Field of Classification Search
CPC ............. G05D 11/16; G05D 23/1858; G05D 23/1353; F24D 19/1051; F24D 19/1015
USPC ..... 122/13.3, 14.1, 4 A; 237/2 A, 2 R, 8 A, 19
See application file for complete search history.

(56) References Cited

U.S. PATENT DOCUMENTS

| | | | |
|---|---|---|---|
| 5,564,462 A * | 10/1996 | Storch ........................... | 137/337 |
| 8,480,004 B2 * | 7/2013 | Farrell ........................ | 237/2 A |
| 2007/0246550 A1* | 10/2007 | Rodenbeck et al. ....... | 236/12.11 |
| 2007/0295826 A1* | 12/2007 | Farrell ........................... | 237/19 |
| 2009/0078218 A1* | 3/2009 | Gordon et al. ............... | 122/13.3 |
| 2012/0024968 A1* | 2/2012 | Beyerle et al. ............. | 236/12.11 |
| 2013/0202277 A1* | 8/2013 | Roetker et al. ................ | 392/441 |
| 2014/0182521 A1* | 7/2014 | Farrell ........................ | 122/18.1 |
| 2014/0202549 A1* | 7/2014 | Hazzard et al. .................. | 137/3 |
| 2014/0203093 A1* | 7/2014 | Young et al. .................. | 237/8 A |
| 2014/0209043 A1* | 7/2014 | Hardesty et al. ............. | 122/18.1 |

FOREIGN PATENT DOCUMENTS

JP    2004150796 A    5/2004

* cited by examiner

*Primary Examiner* — Gregory A Wilson
(74) *Attorney, Agent, or Firm* — Dority & Manning, PA

(57) ABSTRACT

A water heater appliance and a method for operating the same are provided. The method includes receiving a first temperature measurement from a temperature sensor of the water heater appliance, receiving a second temperature measurement from the temperature sensor of the water heater appliance, and establishing if water is flowing through a conduit of the water heater appliance based at least in part on the first and second temperature measurements.

10 Claims, 5 Drawing Sheets

WATER HEATER APPLIANCE AND A METHOD FOR OPERATING THE SAME

FIELD OF THE INVENTION

The present subject matter relates generally to water heater appliance and methods for operating the same.

BACKGROUND OF THE INVENTION

Certain water heater appliances include a tank therein. Heating elements, such as gas burners, electric resistance elements, or induction elements, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks.

To operate efficiently, water heater appliances with mixing valves generally determine whether hot water is in demand or is flowing. When water is flowing through the mixing valve, the mixing valve adjusts the ratio of relatively hot water and relatively cold water in order to control the temperature of water supplied downstream. Certain water heater appliances utilize a flowmeter or a flow sensor to determine if water is flowing through the mixing valve, but such devices can be unreliable. In particular, flowmeters and flow sensors include moving components that can clog or otherwise malfunction due to hard water or debris.

Accordingly, a water heater appliance having a mixing valve that includes features for determining when water is flowing through the mixing valve would be useful. In particular, a water heater appliance having a mixing valve that includes features for determining when water is flowing through the mixing valve without using a flowmeter or a flow sensor would be useful.

BRIEF DESCRIPTION OF THE INVENTION

The present subject matter provides a water heater appliance and a method for operating the same. The method includes receiving a first temperature measurement from a temperature sensor of the water heater appliance, receiving a second temperature measurement from the temperature sensor of the water heater appliance, and establishing if water is flowing through a conduit of the water heater appliance based at least in part on the first and second temperature measurements. Additional aspects and advantages of the invention will be set forth in part in the following description, or may be apparent from the description, or may be learned through practice of the invention.

In a first exemplary embodiment, a method for operating a water heater appliance is provided. The water heater appliance has a tank and a heating element for heating water within the tank. The water heater appliance also has a cold water conduit for directing a flow of water into the tank and a hot water conduit for directing water out of the tank. The water heater appliance further has a mixing valve. The mixing valve is configured for regulating a temperature of water within the hot water conduit by selectively directing a flow of relatively cool water into the hot water conduit. The water heater appliance also has a temperature sensor positioned downstream of the mixing valve for measuring a temperature of water within the hot water conduit. The method includes setting the mixing valve of the water heater appliance to a default position when water is not flowing through the hot water conduit of the water heater appliance, receiving a first temperature measurement from the temperature sensor of the water heater appliance, receiving a second temperature measurement from the temperature sensor of the water heater appliance after the step of receiving the first temperature measurement, determining whether a rate of change of the temperature of water within the hot water conduit is greater than a predetermined value based at least in part on the first and second temperature measurements, and establishing that water is flowing through the hot water conduit of the water heater appliance if the rate of change of the temperature of water within the hot water conduit is greater than the predetermined value at the step of determining whether the rate of change of the temperature of water within the hot water conduit is greater than the predetermined value.

In a second exemplary embodiment, a water heater appliance is provided. The water heater appliance includes a tank that defines a chamber and a heating element for heating water within the chamber of the tank. A cold water conduit is in fluid communication with the chamber of the tank. The cold water conduit is configured for directing a flow of water into the chamber of the tank. A hot water conduit is in fluid communication with the chamber of the tank. The hot water conduit is configured for directing a flow of water out of the chamber of the tank. The water heater appliance also includes a mixed water conduit. A mixing valve is in fluid communication with the hot water conduit, the cold water conduit, and the mixed water conduit. The mixing valve is configured for selectively permitting water from the cold water conduit and the hot water conduit into the mixed water conduit in order to regulate a temperature of water within the mixed water conduit. A temperature sensor is positioned proximate the mixed water conduit and downstream of the mixing valve. The temperature sensor is configured for measuring the temperature of water within the mixed water conduit. The water heater appliance further includes a controller in communication with the mixing valve and the temperature sensor. The controller is configured for setting the mixing valve to a default position when water is not flowing through the mixed water conduit, receiving a first temperature measurement from the temperature sensor, receiving a second temperature measurement from the temperature sensor after the step of receiving the first temperature measurement, and establishing that water is flowing through the mixed water conduit if a difference between the first and second temperature measurements is greater than a predetermined value.

In a third exemplary embodiment, a water heater appliance is provided. The water heater appliance includes a tank that defines a chamber and a heating element for heating water within the chamber of the tank. A cold water conduit is in fluid communication with the chamber of the tank. The cold water conduit is configured for directing a flow of water into the chamber of the tank. A hot water conduit is in fluid communication with the chamber of the tank. The hot water conduit is configured for directing a flow of water out of the chamber of the tank. The water heater appliance also includes a mixed water conduit. A mixing valve is in fluid communication with the hot water conduit, the cold water conduit, and the mixed water conduit. The mixing valve is configured for selectively permitting water from the cold water conduit and the hot water conduit into the mixed water conduit in order to regulate a temperature of water within the mixed water conduit. A temperature sensor is positioned proximate the mixed water conduit and downstream of the mixing valve. The temperature sensor is configured for measuring the temperature of water within the mixed water conduit. The water heater appliance further includes a controller in communication with the mixing valve and the temperature sensor. The controller is configured for receiving a first temperature measurement from the temperature sensor, receiving a second temperature measurement from the temperature sensor, determining whether the temperature of water within the mixed water conduit is unstable based at least in part on the first and second temperature measurements, adjusting the mixing valve if the temperature of water within the mixed water conduit is unstable at the step of determining whether the temperature of water within the mixed water conduit is unstable, receiving an additional temperature measurement from the temperature sensor after the step of adjusting the mixing valve, determining whether a difference between the temperature of water within the mixed water conduit and a set-point temperature of the mixing valve is decreasing based at least in part on the additional temperature measurement of the step of receiving the additional temperature measurement, and establishing that water is not flowing through the mixed water conduit if the difference between the temperature of water within the mixed water conduit and the set-point temperature of the mixing valve is not decreasing at the step of determining whether the difference between the temperature of water within the mixed water conduit and the set-point temperature of the mixing valve is decreasing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
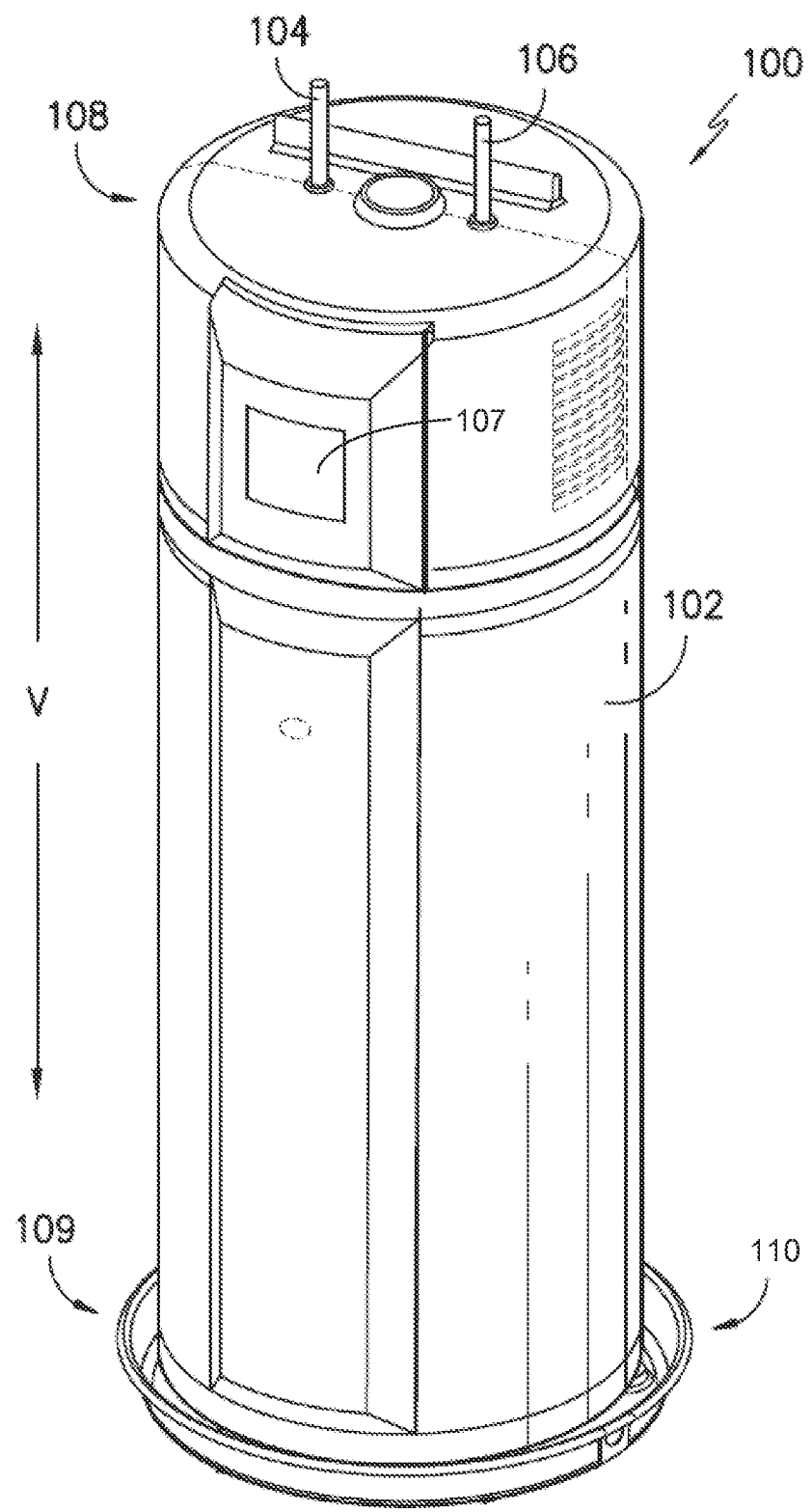
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes a casing 102. A tank 101 (FIG. 2) and heating elements 103 (FIG. 2) are positioned within casing 102 for heating water therein. Heating elements 105 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes a cold water conduit 104 and a hot water conduit 106 that are both in fluid communication with a chamber 111 (FIG. 2) defined by tank 101. As an example, cold water from a water source, e.g., a municipal water supply or a well, can enter water heater appliance 100 through cold water conduit 104 (shown schematically with arrow labeled $F_{cool}$ in FIG. 2). From cold water conduit 104, such cold water can enter chamber 111 of tank 101 wherein it is heated with heating elements 103 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator (not shown) of water heater appliance 100. It should be understood that water heater appliance 100 is provided by way of example only and that the present subject matter may be used with any suitable water heater appliance.

Figure 2:
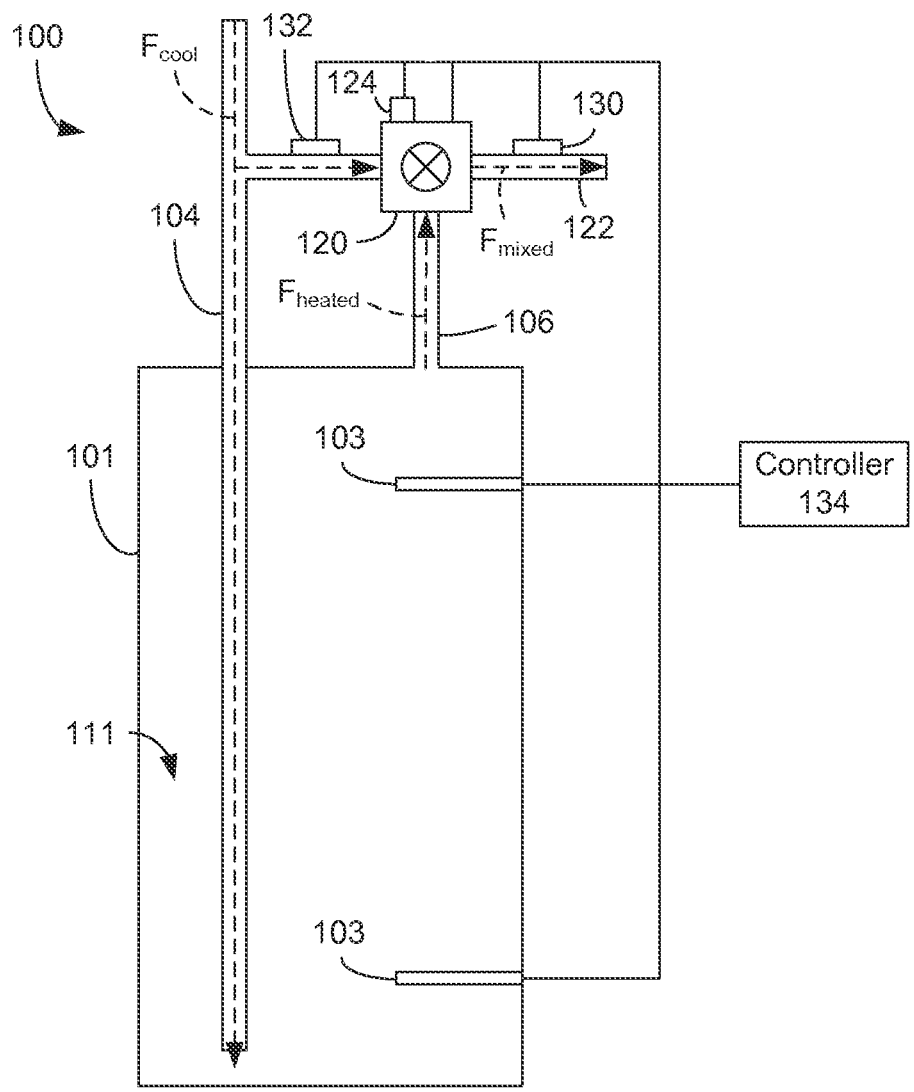
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 includes a mixing valve 120 and a mixed water conduit 122. Mixing valve 120 is in fluid communication with cold water conduit 104, hot water conduit 106, and mixed water conduit 122. As discussed in greater detail below, mixing valve 120 is configured for selectively directing water from cold water conduit 104 and hot water conduit 106 into mixed water conduit 122 in order to regulate a temperature of water within mixed water conduit 122.

As an example, mixing valve 120 can selectively adjust between a first position and a second position. In the first position, mixing valve 120 can permit a first flow rate of relatively cool water from cold water conduit 104 (shown chematically with arrow labeled $F_{cool}$ in FIG. 2) into mixed water conduit 122 and mixing valve 120 can also permit a first flow rate of relatively hot water from hot water conduit 106 (shown schematically with arrow labeled $F_{heated}$ in FIG. 2) into mixed water conduit 122. In such a manner, water within mixed water conduit 122 (shown schematically with arrow labeled $F_{mixed}$ in FIG. 2) can have a first particular temperature when mixing valve 120 is in the first position. Similarly, mixing valve 120 can permit a second flow rate of relatively cool water from cold water conduit 104 into mixed water conduit 122 and mixing valve 120 can also permit a second flow rate of relatively hot water from hot water conduit 106 into mixed water conduit 122 in the second position. The first and second flow rates of the relatively cool water and relatively hot water are different such that water within mixed water conduit 122 can have a second particular temperature when mixing valve 120 is in the second position. In such a manner, mixing valve 120 can regulate the temperature of water within mixed water conduit 122 and adjust the temperature of water within mixed water conduit 122 between the first and second particular temperatures.

It should be understood that, in certain exemplary embodiments, mixing valve 120 is adjustable between more positions than the first and second positions. In particular, mixing valve 120 may be adjustable between any suitable number of positions in alternative exemplary embodiments. For example, mixing valve 120 may be infinitely adjustable in order to permit fine-tuning of the temperature of water within mixed water conduit 122.

Water heater appliance 100 also includes a position sensor 124. Position sensor 124 is configured for determining a position of mixing valve 120. Position sensor 124 can monitor the position of mixing valve 120 in order to assist with regulating the temperature of water within mixed water conduit 122. For example, position sensor 124 can determine when mixing valve 120 is in the first position or the second position in order to ensure that mixing valve 120 is properly or suitably positioned depending upon the temperature of water within mixed water conduit 122 desired or selected. Thus, position sensor 124 can provide feedback regarding the status or position of mixing valve 120.

Water heater appliance 100 also includes a mixed water conduit temperature sensor or first temperature sensor 130 and a cold water conduit temperature sensor or second temperature sensor 132. First temperature sensor 130 is positioned on or proximate mixed water conduit 122 and is configured for measuring a temperature of water within mixed water conduit 122. First temperature sensor 130 is also positioned downstream of mixing valve 120. Second temperature sensor 132 is positioned on or proximate cold water conduit 104 and is configured for measuring a temperature of water within cold water conduit 104. Second temperature sensor 132 is positioned upstream of mixing valve 120. In certain exemplary embodiments, first temperature sensor 130 and/or second temperature sensor 132 may be positioned proximate or adjacent mixing valve 120.

Water heater appliance 100 further includes a controller 134 that is configured for regulating operation of water heater appliance 100. Controller 134 is in, e.g., operative, communication with heating elements 103, mixing valve 120, position sensor 124, and first and second temperature sensors 130 and 132. Thus, controller 134 can selectively activate heating elements 103 in order to heat water within chamber 102 of tank 101. Similarly, controller 134 can selectively operate mixing valve 120 in order to adjust a position of mixing valve 120 and regulate a temperature of water within mixed water conduit 122.

Controller 134 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 134 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 134 can be positioned at a variety of locations. In the exemplary embodiment shown in FIG. 1, controller 134 is positioned within water heater appliance 100, e.g., as an integral component of water heater appliance 100. In alternative exemplary embodiments, controller 134 may be positioned away from water heater appliance 100 and communicate with water heater appliance 100 over a wireless connection or any other suitable connection, such as a wired connection.

Controller 134 can operate heating elements 103 to heat water within chamber 111 of tank 101. As an example, a user can select or establish a set-point temperature for water within chamber 111 of tank 101, or the set-point temperature for water within chamber 111 of tank 101 may be a default value. Based upon the set-point temperature for water within chamber 111 of tank 101, controller 134 can selectively activate heating elements 103 in order to heat water within chamber 111 of tank 101 to the set-point temperature for water within chamber 111 of tank 101. The set-point temperature for water within chamber 111 of tank 101 can be any suitable temperature. For example, the set-point temperature for water within chamber 111 of tank 101 may be between about one hundred and forty degrees Fahrenheit and about one hundred and eighty-degrees Fahrenheit.

Controller 134 can also operate mixing valve 120 to regulate the temperature of water within mixed water conduit 122. For example, controller 134 can adjust the position of mixing valve 120 in order to regulate the temperature of water within mixed water conduit 122. As an example, a user can select or establish a set-point temperature of mixing valve 120, or the set-point temperature of mixing valve 120 may be a default value. Based upon the set-point temperature of mixing valve 120, controller 134 can adjust the position of mixing valve 120 in order to change or tweak a ratio of relatively cool water flowing into mixed water conduit 122 from cold water conduit 104 and relatively hot water flowing into mixed water conduit 122 from hot water conduit 106. In such a manner, controller 134 can regulate the temperature of water within mixed water conduit 122.

The set-point temperature of mixing valve 120 can be any suitable temperature. For example, the set-point temperature of mixing valve 120 may be between about one hundred degrees Fahrenheit and about one hundred and twenty degrees Fahrenheit. In particular, the set-point temperature of mixing valve 120 may be selected such that the set-point temperature of mixing valve 120 is less than the set-point temperature for water within chamber 111 of tank 101. In such a manner, mixing valve 120 can utilize water from cold water conduit 104 and hot water conduit 106 to regulate the temperature of water within mixed water conduit 122.

Figure 3:
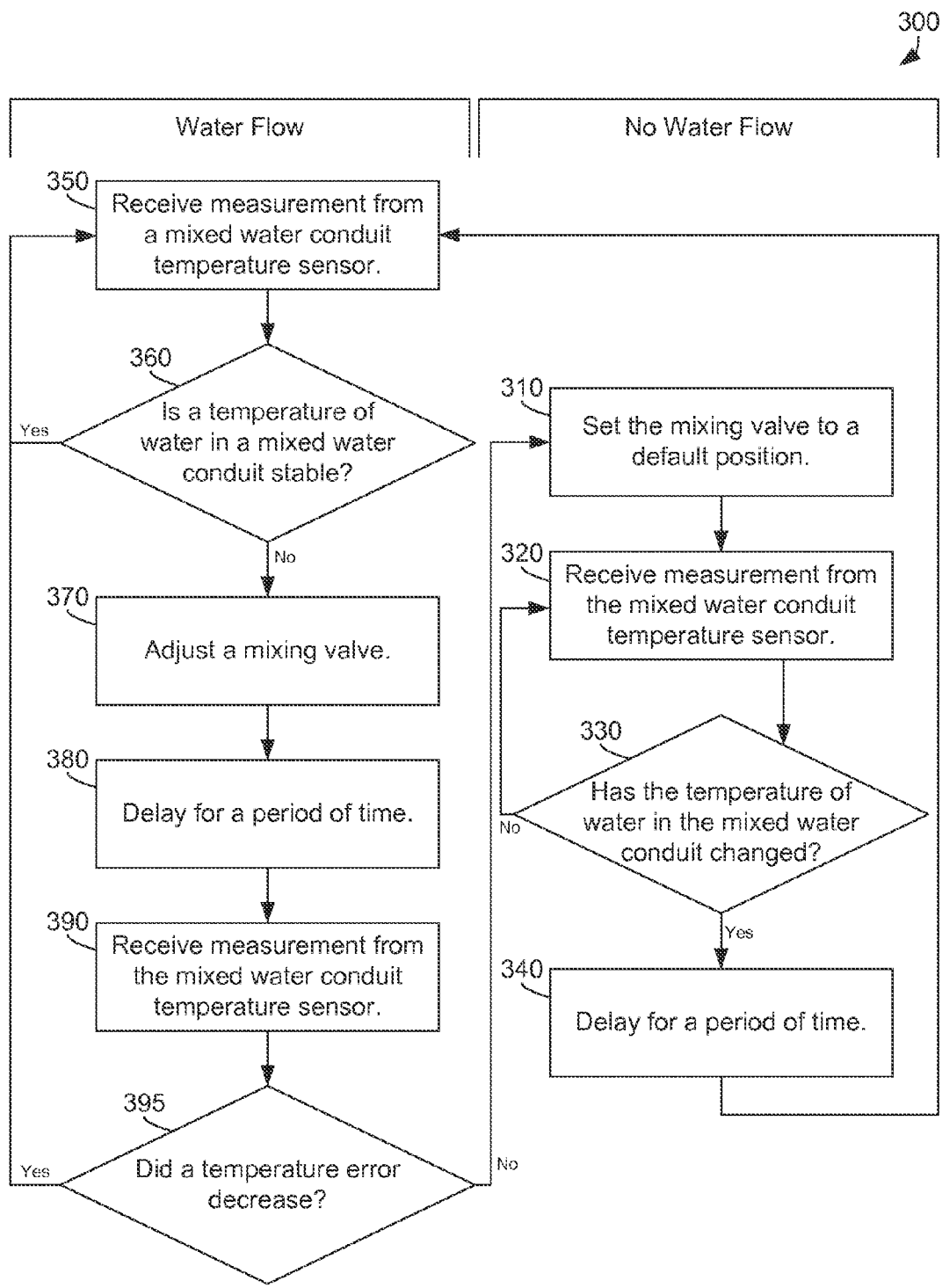
FIG. 3 illustrates a method for operating a water heater appliance according to an exemplary embodiment of the present subject matter.

FIG. 3 illustrates a method 300 for operating a water heater appliance according to an exemplary embodiment of the present subject matter. Method 300 can be used to operate any suitable water heater appliance. For example, method 300 may be utilized to operate water heater appliance 100 (FIG. 1). Controller 134 of water heater appliance 100 may be programmed to implement method 300.

Method 300 can be used to determine whether water is flowing through mixed water conduit 122. In such a manner, method 300 can assist with operating water heater appliance 100, e.g., by assisting operation of mixing valve 120. In particular, knowledge of whether water is flowing through mixed water conduit 122 can assist mixing valve 120 with maintaining a proper or predetermined temperature for water within mixed water conduit 122.

As may be seen in FIG. 3, at step 310, controller 134 adjusts mixing valve 120 to a default position, e.g., when water is not flowing through mixed water conduit 122. Controller 134 can adjust mixing valve 120 at step 310 by signaling or commanding mixing valve 120 to adjust to the default position. To ensure that mixing valve 120 is in the default position or to monitor mixing valve 120, controller 134 can receive a signal from position sensor 124 when mixing valve 120 shifts to the default position.

The default position of mixing valve 120 can correspond to a position of mixing valve 120 where the temperature of water within chamber 111 of tank 101 is about the set-point temperature for water within chamber 111 of tank 101 and the temperature of water within mixed water conduit 122 is about the set-point temperature of mixing valve 120 when water is flowing through mixed water conduit 122. Thus, controller 134 can determine or establish the default position for mixing valve 120 based upon the position of mixing valve 120 when water within chamber 111 of tank 101 is heated by heating elements 103 to about the set-point temperature and the temperature of water flowing through mixed water conduit 122 is about the set-point temperature of mixing valve 120.

With mixing valve 120 in the default position, controller 134 can receive a temperature measurement from first temperature sensor 130 at step 320. Based at least in part on the temperature measurement of step 320, controller 134 can determine whether the temperature of water within mixed water conduit 122 has changed, e.g., dramatically or significantly, at step 330. The temperature of water within mixed water conduit 122 can increase, e.g., slowly or gradually, due to heat transfer from water within hot water conduit 106 when water is not flowing through mixed water conduit 122. Similarly, the temperature of water within cold water conduit 104 can increase, e.g., slowly or gradually, due to heat transfer from water within hot water conduit 106 when water is not flowing through mixed water conduit 122. Conversely, when water begins to flow through mixed water conduit 122, the temperature of water within mixed water conduit 122 can change, e.g., dramatically or significantly. Thus, if the temperature of water within mixed water conduit 122 changes, e.g., dramatically or significantly, at step 330, controller 134 can establish or determine that water is flowing through mixed water conduit 122.

As an example, controller 134 can receive multiple temperature measurements from first temperature sensor 130 at step 320. In particular, controller 134 can receive a first temperature measurement from first temperature sensor 130. After receiving the first temperature measurement, controller 134 can also receive a second temperature measurement from first temperature sensor 130. Based at least in part upon the first and second temperature measurements, controller 134 can determine whether a rate of change of the temperature of water within mixed water conduit 122 is greater than a predetermined value. If the rate of change of the temperature of water within mixed water conduit 122 is greater than the predetermined value, controller 134 can establish that water is flowing through mixed water conduit 122. In such a manner, controller 134 can establish or determine that water is flowing through mixed water conduit 122 based upon temperature measurements with first temperature sensor 130. In alternative exemplary embodiments, controller 134 can establish that water is flowing through mixed water conduit 122 if a difference between the first and second temperature measurements is greater than a predetermined value.

After establishing that water is flowing through mixed water conduit 122, controller 134 can delay for a period of time at step 340. The period of time can be selected in order to permit the temperature of water within mixed water conduit 122 to approach the set-point temperature of mixing valve 120. Water within mixed water conduit 122 can experience a large temperature swing after water begins flowing through mixed water conduit 122. For example, the temperature of water within mixed water conduit 122 can increase rapidly when water starts flowing through mixed water conduit 122 and can decrease and approach the set-point temperature of mixing valve 120 as water continues to flow through mixed water conduit 122. By delaying for the period of time at step 340, controller 134 can avoid responding to the predictable temperature increase when water begins flowing through mixed water conduit 122. Also, mixing valve 120 is in the default position when water begins flowing through mixed water conduit 122 and adjusting mixing valve 120 in response to the predictable temperature increase may be unnecessary.

After establishing that water is flowing through mixed water conduit 122, controller 134 can receive a temperature measurement from first temperature sensor 130 at step 350. Based at least in part on the temperature measurement of step 350, controller 134 can determine whether the temperature of water within mixed water conduit 122 is stable at step 360. If the temperature of water within mixed water conduit 122 is stable at step 360, controller 134 can determine or establish that water is continuing to flow through mixed water conduit 122. Conversely, if the temperature of water within mixed water conduit 122 is unstable at step 360, controller 134 adjust a position of mixing valve 120 at step 370.

As an example, controller 134 can receive multiple temperature measurements from first temperature sensor 130 at step 350. In particular, controller 134 can receive a first temperature measurement from first temperature sensor 130. After receiving the first temperature measurement, controller 134 can also receive a second temperature measurement from first temperature sensor 130. Based at least in part upon the first and second temperature measurements, controller 134 can compare a, e.g., absolute, temperature error of mixing valve 120 to a predetermined error threshold. If the temperature error of mixing valve 120 is greater than the predetermined error threshold, controller 134 can establish that the temperature of water within mixed water conduit 122 is unstable. The temperature error can correspond to a difference between the temperature of water within mixed water conduit 122, e.g., as measured with first temperature sensor 130, and the set-point temperature of mixing valve 120.

Controller 134 adjusts a position of mixing valve 120, e.g., from the default position, at step 370 if the temperature of water within mixed water conduit 122 is unstable at step 360. After adjusting the position of mixing valve 120 at step 370, controller 134 can delay for a period of time at step 380. The period of time can be selected in order to permit the mixing valve 120 to adjust, e.g., from the default position, and/or to permit account for a lag of first temperature sensor 130, e.g., between the measured temperature and the true temperature.

At step 390, controller 134 can receive a temperature measurement from first temperature sensor 130. Based at least in part on the temperature measurement of step 390, controller 134 can determine whether the temperature error of mixing valve 120 is decreasing at step 395. If the temperature error of mixing valve 120 is decreasing at step 395, controller 134 can determine or establish that water is continuing to flow through mixed water conduit 122. Conversely, controller 134 can determine or establish that water is not flowing through mixed water conduit 122 if the temperature error of mixing valve 120 is not decreasing at step 395. Controller 134 can adjust or reset mixing valve 120 to the default position if water is not flowing through mixed water conduit 122 at step 395.

As discussed above, adjusting the position of mixing valve 120 can adjust the temperature of water within mixed water conduit 122 by adjusting the ratio of relatively cool water flowing into mixed water conduit 122 from cold water conduit 104 and relatively hot water flowing into mixed water conduit 122 from hot water conduit 106. At step 370, controller 134 can adjust mixing valve 120 in order to reduce the temperature error of mixing valve 120. For example, if the temperature of water within mixing conduit 122 is low relative to the set-point temperature of mixing valve 120, controller 134 can adjust the position of mixing valve 120 in order to direct additional relatively hot water from hot water conduit 106 into mixed water conduit 122 and/or direct less relatively cool water from cold water conduit 104 into mixed water conduit 122. Conversely, if the temperature of water within mixing conduit 122 is high relative to the set-point temperature of mixing valve 120, controller 134 can adjust the position of mixing valve 120 in order to direct less relatively hot water from hot water conduit 106 into mixed water conduit 122 and/or direct more relatively cool water from cold water conduit 104 into mixed water conduit 122.

If water is flowing through mixed water conduit 122, adjusting the position of mixing valve 120 at step 370 decreases the temperature error of mixing valve 120 at step 395. Conversely, if water is not flowing through mixed water conduit 122, adjusting the position of mixing valve 120 at step 370 does not decrease the temperature error of mixing valve 120 at step 395. Thus, controller 134 can determine or establish that water is continuing to flow through mixed water conduit 122 if the temperature error of mixing valve 120 is decreasing at step 395, or controller 134 can determine or establish that water is not flowing through mixed water conduit 122 if the temperature error of mixing valve 120 is not decreasing at step 395. In such a manner, controller 134 can establish or determine whether water is flowing through mixed water conduit 122 based upon temperature measurements with first temperature sensor 130 and the position of mixing valve 120.

Figure 4:
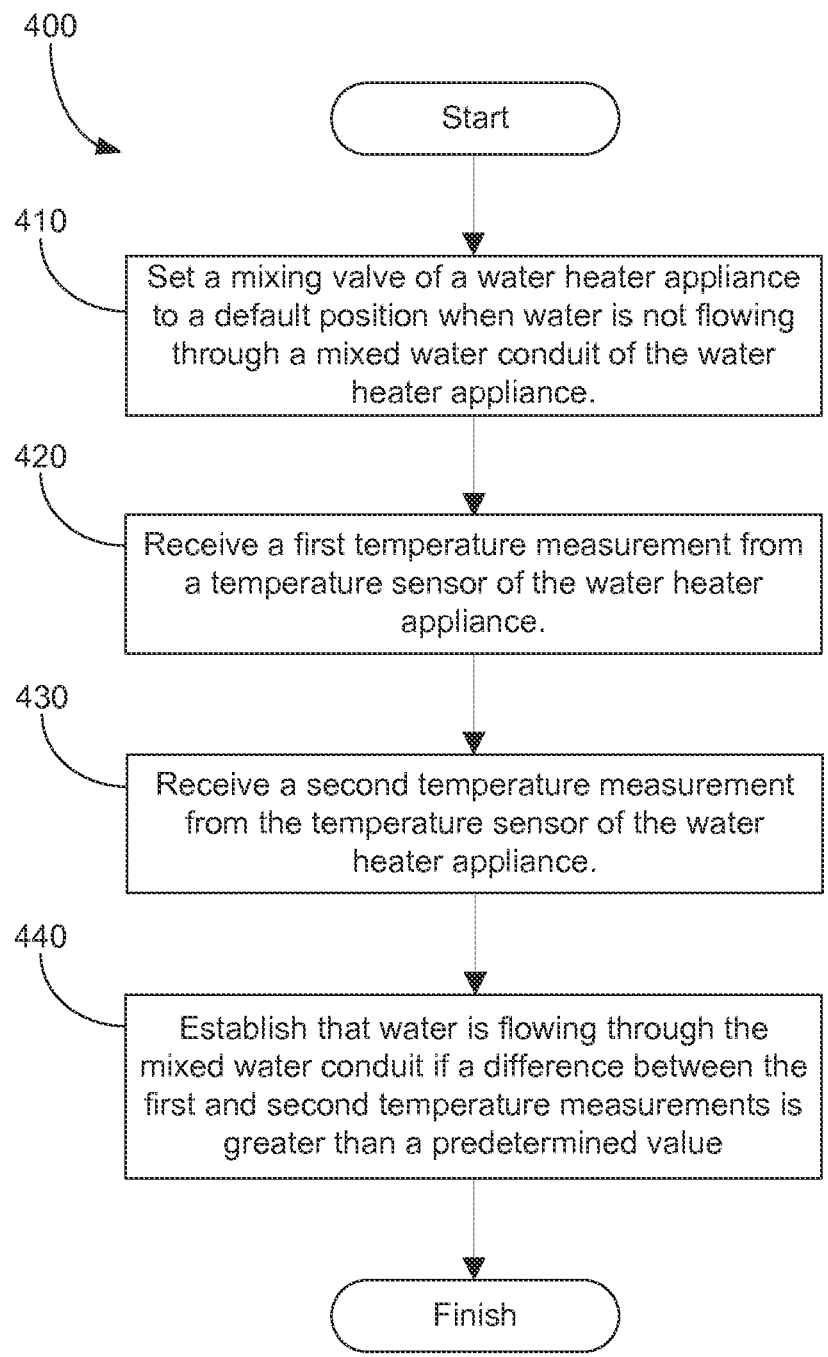
FIG. 4 illustrates an additional method for operating a water heater appliance according to an additional exemplary embodiment of the present subject matter.

FIG. 4 illustrates an additional method 400 for operating a water heater appliance according to an additional exemplary embodiment of the present subject matter. Method 400 can be used to operate any suitable water heater appliance. For example, method 400 may be utilized to operate water heater appliance 100 (FIG. 1). Controller 134 of water heater appliance 100 may be programmed to implement method 400.

Method 400 can be used to determine whether water is flowing through mixed water conduit 122. In such a manner, method 400 can assist with operating water heater appliance 100, e.g., by assisting operation of mixing valve 120. In particular, knowledge of whether water is flowing through mixed water conduit 122 can assist mixing valve 120 with maintaining a proper or predetermined temperature for water within mixed water conduit 122.

At step 410, controller 134 sets mixing valve 120 to the default position, e.g., when water is not flowing through mixing valve 120 and/or mixed water conduit 122. At step 420, controller 134 receives a first temperature measurement from first temperature sensor 130. At step 430, controller 134 receives a second temperature measurement from first temperature sensor 130. Controller 134 can establish that water is flowing through mixing valve 120 and/or mixed water conduit 122 at step 440 if a difference between the first and second temperature measurements is greater than a predetermined value. In alternative exemplary embodiments, controller 134 can establish that water is flowing through mixing valve 120 and/or mixed water conduit 122 at step 440 if a rate of change for water within mixed water conduit 122 is greater than a predetermined value. The rate of change for water within mixed water conduit 122 can be established with the first temperature measurement from step 420 and the second temperature measurement from step 430.

Method 400 can also include receiving a first temperature measurement from second temperature sensor 132 and receiving a second temperature measurement from second temperature sensor 132. Controller 132 can establish that water is not flowing through mixing valve 120 and/or mixed water conduit 122 if the second temperature measurement from second temperature sensor 132 is greater than the first temperature measurement from second temperature sensor 132.

Second temperature sensor 132 is positioned proximate cold water conduit 104 and, e.g., mixing valve 120. If water is not flowing through cold water conduit 104, water within cold water conduit 104 can increase in temperature due to heat transfer from water within hot water conduit 106. Thus, if water within cold water conduit 104 is increasing in temperature, controller 134 can establish that water is not flowing through mixing valve 120 and/or mixed water conduit 122.

Figure 5:
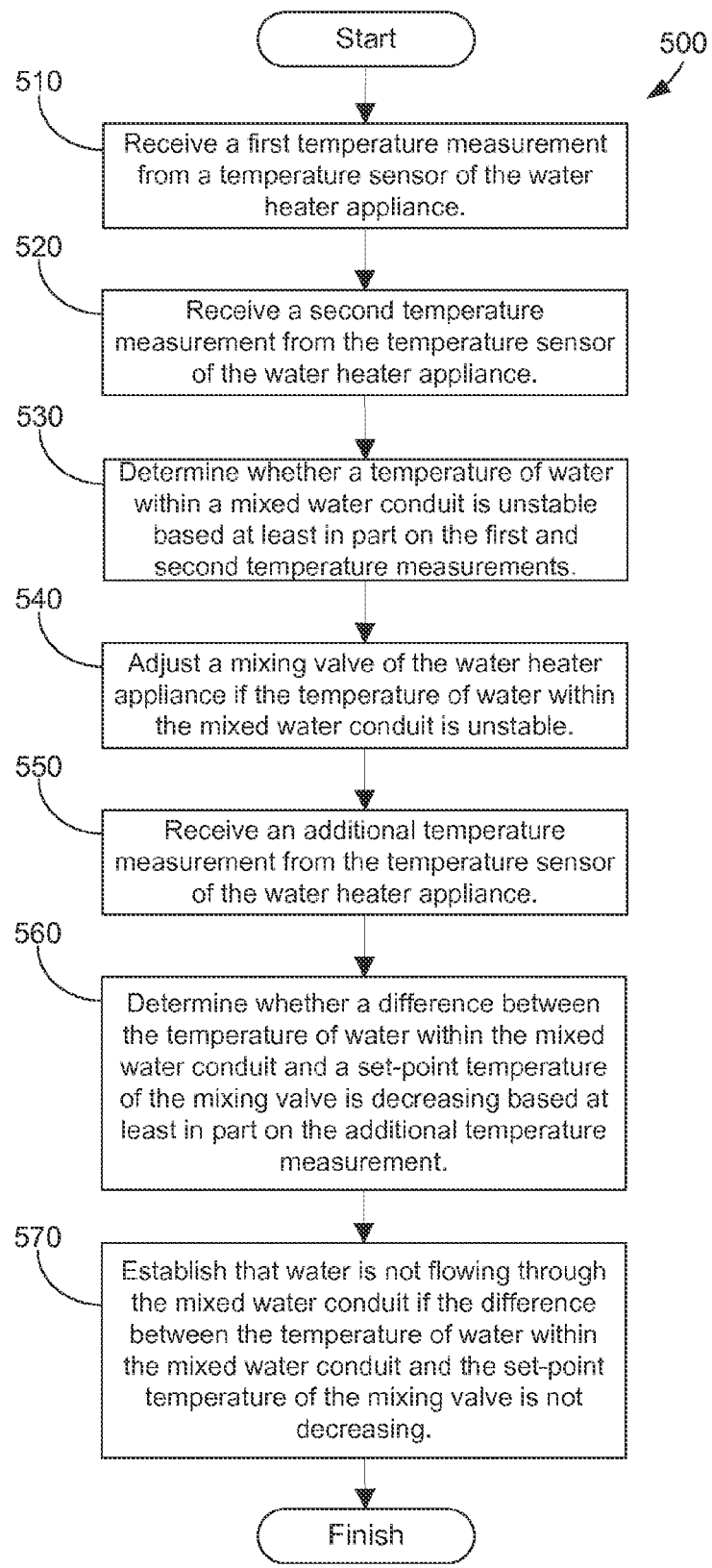
FIG. 5 illustrates another method for operating a water heater appliance according to another exemplary embodiment of the present subject matter.

FIG. 5 illustrates another method 500 for operating a water heater appliance according to another exemplary embodiment of the present subject matter. Method 500 can be used to operate any suitable water heater appliance. For example, method 500 may be utilized to operate water heater appliance 100 (FIG. 1). Controller 134 of water heater appliance 100 may be programmed to implement method 500.

Method 500 can be used to determine whether water is flowing through mixed water conduit 122. In such a manner, method 500 can assist with operating water heater appliance 100, e.g., by assisting operation of mixing valve 120. In particular, knowledge of whether water is flowing through mixed water conduit 122 can assist mixing valve 120 with maintaining a proper or predetermined temperature for water within mixed water conduit 122.

At step 510, controller 134 receives a first temperature measurement from first temperature sensor 130. At step 520, controller 134 receives a second temperature measurement from first temperature sensor 130. Controller 134 determines whether the temperature of water within the mixed water conduit 122 is stable based at least in part on the first and second temperature measurements at step 530. If the temperature of water within the mixed water conduit 122 is unstable, controller 134 adjusts the position of mixing valve 120 at step 540. At step 550, controller 134 receives an additional temperature measurement from first temperature sensor 130. Based at least in part on the additional temperature measurement, controller 134 determines whether a difference between the temperature of water within mixed water conduit 122 and the set-point temperature of mixing valve 120 is decreasing. If the difference between the temperature of water within mixed water conduit 122 and the set-point temperature of mixing valve 120 is not decreasing, controller 134 establishes that water is not flowing through mixed water conduit 122.

It should be understood that in alternative exemplary embodiments, water heater appliance 100 need not include mixed water conduit 122. In such exemplary embodiments, mixing valve 120 can direct water into hot water conduit 106 in order to regulate a temperature of water within hot water conduit 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a water heater appliance, the water heater appliance having a tank and a heating element for heating water within the tank, the water heater appliance also having a cold water conduit for directing a flow of water into the tank and a hot water conduit for directing water out of the tank, the water heater appliance further having a mixing valve, the mixing valve configured for regulating a temperature of water within the hot water conduit by selectively directing a flow of relatively cool water into the hot water conduit, the water heater appliance also having a temperature sensor positioned downstream of the mixing valve for measuring a temperature of water within the hot water conduit, the method comprising:
setting the mixing valve of the water heater appliance to a default position when water is not flowing through the hot water conduit of the water heater appliance;
receiving a first temperature measurement from the temperature sensor of the water heater appliance when water is not flowing through the hot water conduit of the water heater appliance;
receiving a second temperature measurement from the temperature sensor of the water heater appliance after said step of receiving the first temperature measurement;
determining whether a rate of change of the temperature of water within the hot water conduit is greater than a predetermined value based at least in part on the first and second temperature measurements; and
establishing that water is flowing through the hot water conduit of the water heater appliance at said step of receiving the second temperature measurement if the rate of change of the temperature of water within the hot water conduit is greater than the predetermined value at said step of determining whether the rate of change of the temperature of water within the hot water conduit is greater than the predetermined value.

2. The method of claim 1, wherein the default position of the mixing valve corresponds to a position of the mixing valve where a temperature of water within the tank of the water heater appliance is about a set-point temperature for water within the tank of the water heater appliance and the temperature of water within the hot water conduit of the water heater appliance is about a set-point temperature of the mixing valve when water is flowing through the hot water conduit of the water heater appliance.

3. The method of claim 1, further comprising:
receiving an additional temperature measurement from the temperature sensor of the water heater appliance after said step of establishing that water is flowing through the hot water conduit of the water heater appliance;
determining whether the temperature of water within the hot water conduit is unstable based at least in part on the additional temperature measurement of said step of receiving the additional temperature measurement; and
adjusting the mixing valve of the water heater appliance from the default position if the temperature of water within the hot water conduit is unstable at said step of determining whether the temperature of water within the hot water conduit is unstable.

4. The method of claim 3, wherein said step of determining whether the temperature of water within the hot water conduit is unstable comprises:
comparing a temperature error of the mixing valve to a predetermined error threshold; and
determining that the temperature of water within the hot water conduit is unstable if the temperature error of the mixing valve is greater than the predetermined error threshold.

5. The method of claim 3, further comprising delaying for a period of time between said step of establishing that water is flowing through the hot water conduit of the water heater appliance and said step of receiving the additional temperature measurement.

6. The method of claim 5, wherein the period of time is selected in order to permit the temperature of water within the hot water conduit to approach a set-point temperature of the mixing valve.

7. The method of claim 5, further comprising resetting the mixing valve of the water heater appliance to the default position after said step of establishing that water is not flowing through the hot water conduit of the water heater appliance.

8. The method of claim 7, wherein the period of time is selected in order to permit the mixing valve to adjust at said step of adjusting the mixing valve of the water heater appliance and to permit the temperature sensor to change temperature.

9. The method of claim 5, further comprising delaying for a period of time between said step of adjusting the mixing valve of the water heater appliance from the default position and said step of receiving the another temperature measurement.

10. The method of claim 3, further comprising:
receiving another temperature measurement from the temperature sensor of the water heater appliance after said step of adjusting;
determining whether a difference between the temperature of water within the hot water conduit and a set-point temperature of the mixing valve is decreasing based at least in part on the another temperature measurement of said step of receiving the another temperature measurement; and establishing that water is not flowing through the hot water conduit of the water heater appliance if the difference between the temperature of water within the hot water conduit and the set-point temperature of the mixing valve is not decreasing at said step of determining whether the difference between the temperature of water within the hot water conduit and the set-point temperature of the mixing valve is decreasing.

* * * * *